Dec. 13, 1938.                H. W. GOODALL                2,139,745
                               HOSE COUPLING
                            Filed April 7, 1937            2 Sheets-Sheet 1

WITNESS:                                         INVENTOR
                                           Howard W. Goodall
                                              BY
                                           Augustus B. Stoughton
                                                   ATTORNEYS.

Dec. 13, 1938.  H. W. GOODALL  2,139,745
HOSE COUPLING
Filed April 7, 1937  2 Sheets-Sheet 2

WITNESS:
Rob. R. Mitchell.

INVENTOR
Howard W. Goodall
BY
Augustus B. Stoughton
ATTORNEY

Patented Dec. 13, 1938

2,139,745

UNITED STATES PATENT OFFICE 2,139,745

HOSE COUPLING

Howard W. Goodall, Aldan, Pa.

Application April 7, 1937, Serial No. 135,411

1 Claim. (Cl. 285—80)

A hose clamped upon the parallel ring form circumferential ribs of a nipple, shank or stem will withstand a very strong pull in the direction of the length of the hose without leakage or detachment, but if the hose and nipple are relatively twisted, as frequently occurs in use, leakage and detachment occur even when the pull or twist is relatively weak.

One reason for this is that relative movement of rotation between the inner face of the wall of the hose and the surface of the circumferential annular ribs against which it is pressed into close and intimate contact, breaks or destroys the seal, and may even distort the rubber lining of the hose in such a way that it comes off the nipple.

It is the principal object of the present invention to avoid this defect and disadvantage, and to avoid leakage and detachment of the hose in respect to the nipple to which it is clamped, even when the hose and nipple are subject to relative twisting and to a longitudinal pull.

Other objects of the invention will appear from the following description at the end of which the invention will be claimed.

To these and other ends hereinafter described or appearing, the invention comprises the association, either as separate units or as resultant or composite forms of longitudinal ribs and circumferential annular ribs, or in other words of ribs in divergent relation, upon the outer surface of the nipple, and upon which the inner face of the rubber lining of the hose is immovably clamped and sealed against not only turning but also endwise stresses and strains.

The invention also comprises the improvements to be presently described and finally claimed.

In the following description reference will be made to the accompanying drawings, forming part hereof, and in which, Figure 1 is a longitudinal section with parts shown in elevation of a hose coupling embodying features of the invention and showing the ribs disposed in intersecting or divergent directions.

Figure 1:
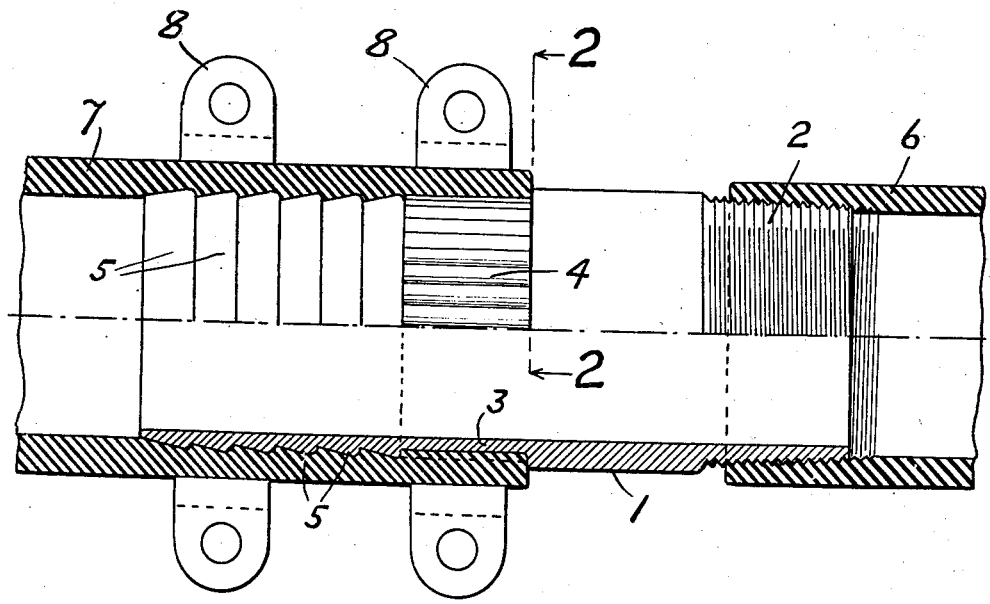
Figure 2:
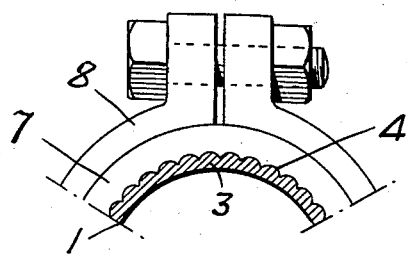
Figure 2 is a fragmentary sectional view taken on the line 2—2 of Figure 1.

Referring to the drawings, 1 indicates a pipe nipple having at one end an external taper thread 2 and being at the other end reduced in external diameter as indicated at 3. The portion of reduced external diameter is externally provided with longitudinally disposed ribs 4 and with circumferentially disposed ribs 5 of which the high parts are straight and lie in a ring or annulus. 6 indicates an internal threaded pipe into which the end of the pipe nipple 1, which is provided with the tapering thread 2, is screwed. 7 indicates a hose which is rubber lined and which is applied over the end of the nipple which is provided with the associated circumferential and longitudinal ribs, teeth, projections or corrugations, arranged as separate units. 8 are clamping means for pressing the inner rubber surface of the hose and the outer metal surface of the ribs into intimate sealing contact.

The mode of operation may be described as follows: The pipe 6 may represent a fixed pipe with which it is desired to connect the hose in such a way that it will be leak proof and permanently attached. In use the hose 7 and the nipple 1 are subjected not only to relative endwise pull but also to relative twisting motion. The circumferential ribs resist the endwise pull while a tight seal is maintained, but if the hose and nipple are relatively twisted and at the same time subjected to a very slight endwise pull, leakage takes place and the hose is likely detached. I believe that is at least in part due to the distortion of the rubber lining of the hose. However, the longitudinally disposed ribs 4 oppose this twisting movement and in that way maintain the seal and oppose detachment of the hose. The ribs are disposed in intersecting or divergent directions or relation and they serve to oppose both turning and longitudinal movements of the hose on the nipple.

Figure 3:
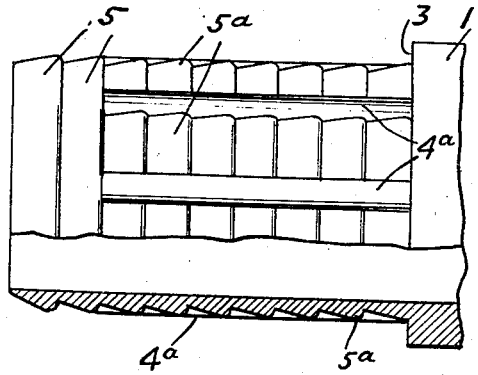
Fig. 3 is a view partly in section and partly in elevation showing a modification in which the ribs are superposed.

The construction and mode of operation of the various modifications shown in Figs. 3 to 7 are as above described except as follows:

In Fig. 3, the longitudinal ribs 4ª, are superposed upon some of the circumferential ribs 5ª, while at the end portion, the circumferential ribs 5 remain as before.

Figure 4:
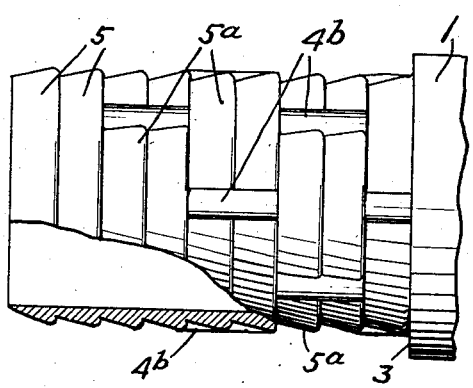
Fig. 4 is a similar view showing the longitudinal ribs formed in sections and staggered.
Figure 5:
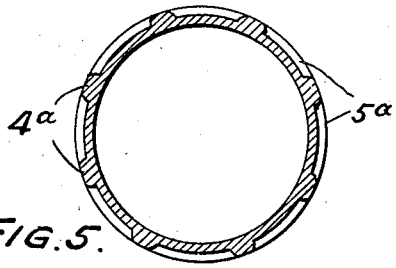
Fig. 5 is a transverse sectional view of Fig. 4.

In Fig. 4, the longitudinal ribs 4ᵇ are sectional and the sections are staggered.

Figures 6, 7:
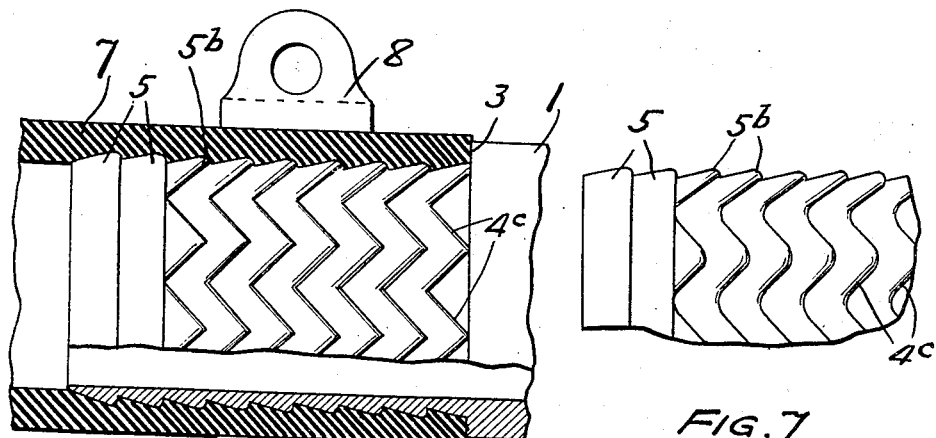
Fig. 6 is a view similar to Fig. 1 and in which the ribs are the composite and resultant of staggered longitudinal and circumferential ribs, and are disposed in intersecting or divergent directions.
Fig. 7 is a fragment of a similar view illustrating a modification of the arrangement shown in Fig. 6.

In Fig. 6, the high parts of the circumferential ribs 5ᵇ are arranged as a circle or annulus, but they follow a zig-zag path, and this gives rise to rib parts 4ᶜ which trend sufficiently in longitudinal direction for opposing twisting movement between the nipple and hose. In this case the rib parts are disposed in intersecting or divergent directions or relation.

In Fig. 7, the construction is substantially the same as in Fig. 6 except that the high parts of the ribs follow sinuous lines.

The invention is applicable to coupling stems or shanks as well as to nipples, consequently the word nipple is used herein and in the claim inclusively.

It will be obvious to those skilled in the art to which the invention relates that modifications may be made in details of construction and arrangement without departing from the spirit of the invention which is not limited to matters of mere form and arrangement or otherwise than the prior art and the appended claims may require.

I claim:

In a hose coupling including a hose and clamping means and, in combination therewith, a nipple externally cylindrical and provided with associated circumferential ribs and longitudinal ribs of uniform height and to which the inner face of the hose wall is clamped, the circumferential ribs serving to oppose detachment of the hose when pulled, and the longitudinal ribs of uniform height and width throughout their lengths serving to oppose relative movement between the circumferential ribs and the hose wall such as causes leakage when the hose and nipple are relatively twisted.

HOWARD W. GOODALL.